Patented June 7, 1949

2,472,267

UNITED STATES PATENT OFFICE 2,472,267

PROCESS FOR PREPARING GLUTEN SULFATE AND SALTS THEREOF

Henry C. Reitz, Berkeley, Calif., assignor to the United States of America as represented by the Secretary of Agriculture No Drawing. Application August 17, 1945, Serial No. 611,216

7 Claims. (Cl. 260—112)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the production of gluten sulfates of the general type disclosed in Patent No. 2,344,267, and has among its objects improvement in the processes of that patent.

According to the above-mentioned patent, protein sulfates are obtained by reacting proteins with a sulfur trioxide-yielding agent, particularly chlorosulfonic acid, in the presence of a tertiary amine. It has been found, however, in accordance with the present invention, that it is possible to obtain quite similar sulfates from gluten by reacting the gluten with concentrated sulfuric acid without the use of the tertiary amine. This has the advantage over the patent of economy due to elimination of tertiary amines. Also, since the amines are toxic and have unpleasant odors, care is needed in purification when they are used, whereas, with the present process, purification is simplified.

In general, the reaction of this invention is carried out with the chilling of the reaction mixture. A temperature of not over about 0° C. is preferred. The 0° C. temperature is readily maintained with the ice bath, although other means of regulating with variations in the degree of temperature may be used.

The following examples specifically exhibit the processes:

Example I

One hundred grams of air-dry gum gluten (wheat gluten) is added slowly with efficient mechanical stirring, to 2 liters of reagent concentrated sulfuric acid contained in an open jar and cooled to about −2° C. with a suitable cooling means. In order to prevent lumping, the gluten may be dusted into the acid through a suitable screen. The blades of the stirrer, if made of metal or other corrodible material, should be protected from corrosion by a coating, such as a coating of "Bakelite" lacquer. After stirring in the cold for about 1 hour, the means for cooling is removed and the stirring continued until the mixture reaches room temperature. This usually requires about 3 hours. The reaction product is then slowly poured, with constant stirring, over about 25 pounds of cracked ice. It is essential that a large excess of ice should always be present during this step.

Water is added to give a volume of about 5 gallons, and the insoluble reaction product is filtered on acid-resistant cloth, washed once with about 3 liters of water and filtered again. In order to secure a granular material that can be suspended in water without lumping, the moist solid is then treated in small portions with 3 to 4 liters of acetone in a Waring Blendor run at low speed. The combined acetone suspensions are allowed to stand overnight, after which the supernatant acetone is siphoned off.

To form the sodium salt of the gluten sulfate, the residue above mentioned is slowly added with stirring to about 5 gallons of water and 0.5 N NaOH is added with stirring to give a pH of about from 7.3 to 7.5. Any small lumps that may be present can be removed by pouring the suspension through a pyramid type wire screen and grinding the lumps in a mortar.

Other salts can be formed by using the desired inorganic hydroxide in place of the NaOH. Salts of gluten sulfate with gelling properties can also be formed by the action of organic bases such as monoethanol amine and morpholine.

The thick aqueous suspension of the sodium salt of the gluten sulfate thus formed is washed with distilled water in a basket-type centrifuge until free of inorganic sulfates. The resulting gel is dehydrated with acetone, filtered and dried at room temperature or up to about 60° C. Higher temperatures should be avoided, since they tend to reduce the water-absorbing ability of the dried material. The yield of dry sodium salts obtained is about 50% of theoretical based on the weight of the gluten used.

Example II

One hundred milliliters of reagent concentrated sulfuric acid and 0.5 ml. of dry triamyl amine are thoroughly mixed and introduced into a Waring Blendor bowl. This amount of amine is added to prevent corrosion of the metallic blades of the Blendor. The speed of the Blendor is reduced, and a small amount of powdered solid carbon dioxide (Dry Ice) is added. To the cold stirred acid, 5 grams of dry gum gluten is added in small amounts, small quantities of powdered solid carbon dioxide being introduced from time to time to keep the mixture cold and of the desired consistency for stirring. As soon as all the gluten has been added, the thick, creamy mass is poured into a beaker and allowed to stand until it reaches room temperature.

Separation and purification of the resulting product and formation of the sodium salt may be carried out according to the procedure of Example I.

Example III

One hundred fifty milliliters of concentrated reagent sulfuric acid is cooled in an ice-salt bath, and 5 grams of dry gum gluten is dusted therein with efficient stirring. Dry methane is bubbled into this mixture, care being taken to exclude moist air, and a mixture of 11 ml. of chlorosulfonic acid and 10 ml. concentrated reagent sulfuric acid is added dropwise with stirring. After addition of the latter mixture, the freezing bath is removed, the reaction mixture stirred about 1 hour at room temperature and then stored overnight at about 5° C.

Sodium gluten sulfate may be formed, separated, and purified by the procedure of Example I.

Example IV

Gluten sulfate may also be produced by using concentrated sulfuric acid containing about 4% of sulfur trioxide as the sulfating mixture. This mixture may be prepared by using about 100 ml. of concentrated sulfuric acid and 60 ml. of 30% fuming sulfuric acid to form the acid and sulfur trioxide, which may be used in accordance with the procedure of Example I with about 5 g. of gluten.

Example V

Seventy-five grams of air-dry gum gluten is placed in a one-gallon, wide-mouthed, screw-cap type of jar 150 milliliters of absolute alcohol is added, and the jar is closed securely. This jar and a glass-stoppered graduate containing 1500 milliliters of cp. concentrated sulfuric acid are stored in a room maintained at −34° C. until they reach that temperature. The reactants are removed from the cold room, the gluten resuspended in the alcohol, and the acid quickly added with rapid stirring. The jar containing the reaction mixture is then tightly closed and stored overnight at −17° C. The procedure for isolation and purification followed is essentially that of Example I, with the exception that the washing of the crude gluten sulfate with water is omitted and two washings with acetone substituted. The acetone from the second washing is removed by centrifuging in a basket-type centrifuge. The residue while still in the centrifuge bowl is suspended in about one liter of acetone to prevent lumping, 4 gallons of distilled water is added slowly with frequent agitation, and the gluten sulfate is separated by centrifugation. Washing of the gluten sulfate by centrifugation is repeated twice with 4-gallon portions of distilled water. Sodium gluten sulfate is then formed by the addition of 0.5 N NaOH to pH 7.5 to 8.0 and the remainder of the purification and isolation carried out according to the procedure of Example I.

One advantage of this variation in procedure is that removal of excess sulfuric acid is more rapid because gluten sulfate as the free acid occupies only about ⅕ the volume occupied by the same weight of sodium salt. Another advantage is that the isolation of the water-soluble gluten sulfate is facilitated. Most of the acid and a little of the soluble sulfated gluten is removed by the acetone washes. The water-soluble gluten sulfate is isolated from the water washes subsequently to acetone washing and prior to the formation of the sodium salt. The water washes are combined, 3 N NaOH added to pH 7 to 8, sodium sulfate removed by dialysis, and the solution concentrated to small volume. The dry water-soluble sodium gluten sulfate is then obtained by drying from the frozen state or other suitable means.

Example VI

Two and one-half grams of air-dry gum gluten is placed in a screw-cap type of jar, 10 milliliters of low-boiling fraction of petroleum is added, and the jar is closed securely. This petroleum fraction is variously known as petroleum ether, benzene, Skellysolve, high-test gasoline, etc. The gluten suspension and 20 milliliters of cp. concentrated sulfuric acid contained in a glass-stoppered graduate are stored at −34° C. until they reach this temperature. They are then removed to a room maintained at 0° C., the gluten suspended in the petroleum fraction and the acid added quickly with rapid stirring. The jar is closed to the air and allowed to stand at 0° C. for one to three hours. Sodium gluten sulfate is then purified and isolated by the procedure of Example V.

The use of the petroleum fraction as an extender reduces the quantity of sulfuric acid needed to ⅕ of that required in the other procedures.

The gluten sulfates prepared by the above processes are pale yellow, non-hygroscopic powders that swell to from 100 to 300 times their volume when wetted with cold water. Gels formed are colorless, odorless, tasteless and non-toxic. In these properties they resemble the gluten sulfates prepared by the process of the above-mentioned patent. However, the products prepared by the two methods differ somewhat in their chemical compositions, as indicated below:

|  | Per Cent Sulfur | Per Cent Nitrogen |
| --- | --- | --- |
| Gluten sulfate (pyridine process). | About 4 to 10 | About 8 to 13. |
| Gluten sulfate (sulfuric acid process). | About 3.5 to 4.5 | About 13 to 15. |

Because of the properties above indicated, the gluten sulfates, especially the salts formed from hydroxides, may be substituted for such natural gums as tragacanth and acacia. Since the gluten sulfate gels are not affected by freezing, they may function as protective colloids in frozen fruit purees and ice cream, and may be also used as stiffening or bodying agents in pie fillings such as custards and frozen fruit fillings. They are also suitable as emulsifying or carrying agents in various pharmaceutical pastes, salves and ointments. The calcium salt of gluten sulfate has been used in dental surgery to cause the speedy formation of clots and thus to reduce bleeding.

The sulfated proteins described above are quite different in their properties from certain so-called "protein sulfates" which are formed when proteins are precipitated from solution by adding sulfuric acid. The protein sulfates of this invention in contrast to "protein sulfates" formed as mentioned above possess properties remarkably different from the original protein, and furthermore, the original protein and properties cannot be regenerated from them. The sulfate groups in the sulfated proteins of this invention exist in stable chemical combination and are unaffected by variations in hydrogen ion concentration, for example, from a pH of 2 to a pH of 11. Protein combinations, on the other hand, with a sulfate ion, are decomposed when subjected to the alkaline side of the isoelectric point, and in most cases the protein with all or nearly all of its original properties can be recovered.

Having thus described the invention, what is claimed is.

1. A process for the preparation of gluten sulfate comprising reacting wheat gluten with concentrated sulfuric acid at a temperature of not over about 0° C.

2. A process for the preparation of gluten sulfate comprising reacting wheat gluten suspended in an organic solvent with concentrated sulfuric acid, the process incuding cooling of the gluten suspension and acid separately to −34° C., mixing the suspension and acid, and then allowing the reaction to proceed at about −17° C.

3. A process for the preparation of gluten sulfate comprising reacting wheat gluten suspended in a low-boiling petroleum fraction with concentrated sulfuric acid, the process including cooling the gluten suspension and acid separately to −34° C., mixing the suspension and acid, and then allowing the mixture to stand at about 0° C. for about 1 hour.

4. A process for the preparation of salt of gluten sulfate comprising reacting a gluten with concentrated sulfuric acid at a temperature of not over about 0° C., followed by reacting the reaction product with an inorganic hydroxide.

5. A process for the preparation of a salt of gluten sulfate comprising reacting wheat gluten with concentrated sulfuric acid at a temperature of not over about 0° C., followed by reacting the reaction product with an organic base.

6. A process for the preparation of a salt of gluten sulfate comprising mixing a gluten with concentrated sulfuric acid and retaining the temperature at not over about 0° C. during the reaction process, separating the gluten sulfate thus formed from the reaction mass, mixing the gluten sulfate with an inorganic hydroxide to form a salt of the gluten sulfate, and purifying the salt thus formed by washing with water.

7. A process for the preparation of a salt of gluten sulfate comprising mixing a gluten with concentrated sulfuric acid and retaining the temperature at not over about 0° C. during the reaction process, separating the gluten sulfate thus formed from the reaction mass, mixing the gluten sulfate with an organic base to form a salt of the gluten sulfate, and purifying the salt thus formed by washing with water.

HENRY C. REITZ.

REFERENCES CITED

The following references are of record in the file of this patent:

UNITED STATES PATENTS

| Number | Name | Date |
|---|---|---|
| 1,936,753 | Dreyfus et al. | Nov. 28, 1933 |
| 2,344,267 | Reitz | Mar. 14, 1944 |
| 2,413,983 | Lustig et al. | Jan. 17, 1947 |

OTHER REFERENCES

Harris et al., Jour. Research of the National Bureau of Standards, vol. 18, March 1937, pages 343 to 350.

Proc. Am. Assn. Textile Chem. and Col., April 4, 1938, p. 187.

Reitz et al., Ind. and Eng. Chem., Dec. 1944, pp. 1149–1151.